(12) United States Patent
Nan et al.

(10) Patent No.: US 7,971,090 B2
(45) Date of Patent: Jun. 28, 2011

(54) METHOD OF TESTING SERVER SIDE OBJECTS

(75) Inventors: Jun Jie Nan, Beijing (CN); Meng Wang, Beijing (CN); Zi Yao Wang, Beijing (CN); Zheng Hui Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/236,561

(22) Filed: Sep. 24, 2008

(65) Prior Publication Data
US 2009/0083578 A1 Mar. 26, 2009

(30) Foreign Application Priority Data

Sep. 26, 2007 (CN) .......................... 2007 1 0161921

(51) Int. Cl.
*G06F 11/00* (2006.01)
(52) U.S. Cl. ............. 714/4; 714/703; 719/315; 709/202
(58) Field of Classification Search .................. None
See application file for complete search history.

(56) References Cited

U.S. PATENT DOCUMENTS

| | | | |
|---|---|---|---|
| 6,510,402 B1* | 1/2003 | Logan et al. .................. | 702/186 |
| 6,766,477 B2 | 7/2004 | Grucci et al. | |
| 7,526,680 B2* | 4/2009 | Mathew et al. ................. | 714/37 |
| 7,590,973 B1* | 9/2009 | Barry et al. .................... | 717/126 |
| 2002/0162059 A1* | 10/2002 | McNeely et al. ............. | 714/703 |
| 2003/0188224 A1* | 10/2003 | Decker .......................... | 714/25 |
| 2004/0143625 A1 | 7/2004 | Sheinis et al. | |
| 2004/0162874 A1* | 8/2004 | Woo et al. ..................... | 709/203 |
| 2004/0205771 A1 | 10/2004 | Sudarshan et al. | |
| 2005/0050548 A1 | 3/2005 | Sheinis et al. | |
| 2006/0036910 A1* | 2/2006 | Fung et al. ...................... | 714/25 |
| 2007/0169015 A1* | 7/2007 | Seelig et al. ................... | 717/136 |
| 2007/0203973 A1* | 8/2007 | Landauer et al. ............. | 709/203 |
| 2008/0109680 A1* | 5/2008 | Kodaka et al. .................. | 714/38 |
| 2009/0276663 A1* | 11/2009 | Kaksonen ........................ | 714/25 |
| 2009/0307763 A1* | 12/2009 | Rawlins et al. .................... | 726/5 |

OTHER PUBLICATIONS

Wenliang Xiong, "In-Container Testing for Web Portal Applications", Department of Computer Science, University of Calgary, Calgary, Alberta, Sep. 2006.
Arturo Sanchez, "Automatic Support for Testing Web-Based Enterprise Applications", ACM SE, Melbourne, FL Mar. 2006.

* cited by examiner

*Primary Examiner* — Christopher S McCarthy
(74) *Attorney, Agent, or Firm* — Winstead, P.C.

(57) ABSTRACT

There is disclosed a method and system of testing server side objects in a client-server environment. A proxy is created of a first object on a server side on a client side. The proxy invokes a method of the first object on the server side to conduct a test by a test case deployed on the client side. A proxy is created of a second object on the client side by the proxy of the first object by the process of invoking the method of the first object on the server side. The creation of the proxies and objects are performed recursively.

18 Claims, 5 Drawing Sheets

METHOD OF TESTING SERVER SIDE OBJECTS

FIELD OF THE INVENTION

The invention relates to the field of client server environments, and more particularly to the testing of server side services and/or objects in an Service Oriented Architecture (SOA) environment, including a method of testing server side objects with loose-coupled test logic in a client-server environment.

BACKGROUND OF THE INVENTION

Server side programming is typically container-based, and all of services and relevant business logic are resident in different containers, such as various J2EE (Java 2 Platform Enterprise Edition) containers. The story is the same in an SOA (Service Oriented Architecture) environment. Services and components are available in application servers and maintained by containers. Thus, how to build automation test cases for those services and underlying implementation logic, as well as relevant supporting code in containers, make this kind of test as agile as the test of J2SE (Java 2 Platform Standard Edition) components is an important issue to be solved.

FIG. 1 illustrates such a typical test framework in the prior art. Generally, the test cases are packaged and deployed in server side containers for execution since the test logic will rely more and more on service functions provided by the containers. Some test tools build a test harness on the client side with redirector proxies to reflect test cases on the server side (such as Apache Cactus), or with servlets and XML configuration files to expose test cases on the server side (JUnitEE). Nevertheless, the test cases need to be rebuilt and redeployed to the server whenever any changes occur.

SUMMARY OF THE INVENTION

According to one embodiment, there is provided a method of testing server side objects in a client-server environment. The method includes creating a proxy of a first object on a server side on a client side and invoking, by the proxy, a method of the first object to test a test case deployed on the client side. A second object is generated from the method of the first object and a proxy is created of the second object on the client side by the proxy of the first object. The steps of invoking, generating, and creating are performed recursively to test subsequently generated objects.

Some embodiments include invoking the method of the first object on the server side through the proxy by the test case and passing the invocation of the method of the first object by the test case to an agent on the server side over a network by the proxy. The method of the first object is invoked according to the invocation by the agent and the execution results of invoking the method of the first object to the proxy on the client side are passed over the network by the agent.

Embodiments may further include replacing a proxy in the parameters of the invocation with a corresponding index identifier and replacing the index identifier in the invocation with a corresponding server side object. Other embodiments may include registering the second object and the index identifier of the second object by the agent and passing the index identifier of the second object and a class of the object to the proxy of the first object on the client side over the network. The proxy of the second object is therefore created according to the received index identifier of the second object and the received class of the second object by the proxy of the first object.

BRIEF DESCRIPTION THE SEVERAL VIEWS OF THE DRAWINGS

The attached claims describe features that are characteristic of the invention. However, the invention and its various embodiments can be best understood from the following detailed description of the illustrative embodiments when read in conjunction with the drawings, in which:

DETAILED DESCRIPTION

Figure 1:
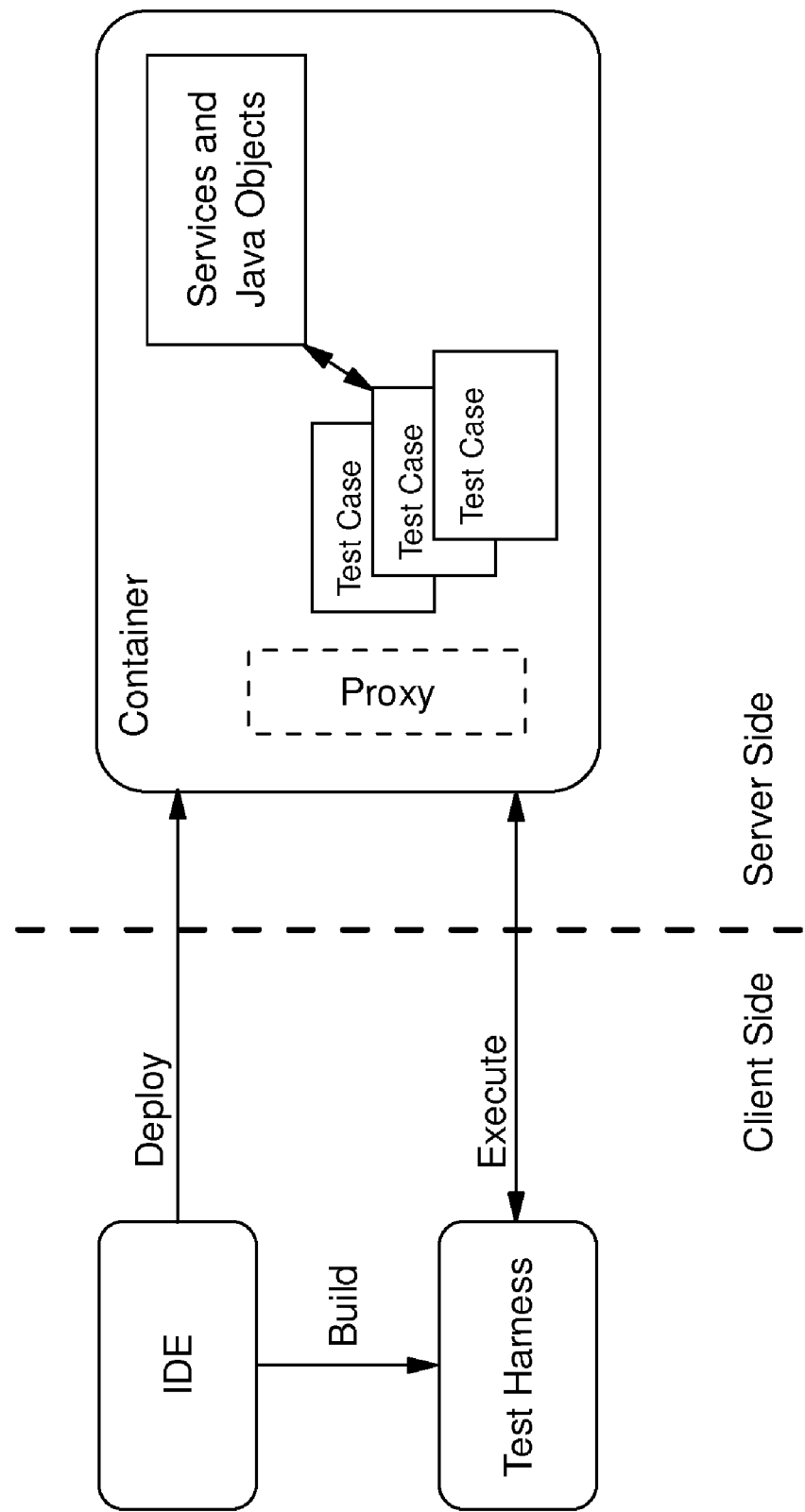
FIG. 1 illustrates a typical test framework in the prior art.

Embodiments of the invention will be explained hereinafter. However, it is to be understood that the invention is not limited to the specific embodiments described herein. On the contrary, it is contemplated to implement or practice the invention using any combination of the following features and elements, regardless of whether they involve different embodiments. Therefore, the following aspects, features, embodiments and advantages are only used for illustration and should not be regarded as the elements or definitions of the attached claims, unless indicated explicitly in the claims. The reference of features, advantages or similar language herein does not imply that all or certain features and elements that can be realized using the invention are within any single embodiment of the invention. On the contrary, the language involving features and advantages should be understood as only meaning that the specific features, advantages and characteristics described in association with embodiment are contained in at least one embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention provide a method for testing server side services or objects such as Java objects. The original in-container test logic is on the client side executed through dynamic recursive proxies. By using embodiments of the invention, the execution steps of test logic and test code can be loose-coupled. In other words, the invention enables using client side proxies to handle remote server side objects in containers.

The dynamic recursive proxies have the following characteristics:
(1) They can cover all of the services and Java classes that can be exposed on the server side;
(2) Proxies can be created dynamically and recursively when necessary, and the created dynamic recursive proxies are transparent to client code;
(3) The lifecycles of proxies and their corresponding objects' lifecycles are managed; and
(4) They can be used as a mock server.

This approach realizes test logic on the client side, and the test cases can manipulate real objects via the dynamic proxies. The first remote object may be explicitly created via a remote dynamic proxy, then the test logic need not create proxies explicitly, but rather may be automatically generated. Thus, testers can use a common automation test framework such as JUnit for Java tests to develop and execute their test logic in an agile way, and use real in-container objects instead of mock objects. When any changes occur, testers can make changes on the client side and re-execute the test cases without re-deploying the test cases onto the server side.

The proxies and their corresponding objects have the same interfaces. As a debugger cannot tell the difference between proxies and its objects, test logic API level debugging is enabled with the invention, and this will help problem determination in a production environment. Thus, the proxies enable a mock server.

As described according to embodiments of the invention, the proxies are generated in a dynamically and recursively. Once a new proxy is created, it will work with all existing proxies and non-proxy objects. In other words, the proxy can use other proxies and non-proxy objects as parameters, and can be used as parameters by other proxies and non-proxy objects, or return new proxies as return values when necessary. This can shorten the learning curve, as a user just needs to know how to create the first proxy The proxy and its corresponding object own a same life cycle. The creation of a proxy and the corresponding objects is almost at the same time. When the proxy is destroyed on the client side, for example, by a Java garbage collector, the corresponding object on the server side may be destroyed. This prevents long-term memory leak issues.

A method and system of testing server side objects with loose-coupled test logic in a client-server environment according to one embodiment will be described below with reference to the drawings and by taking a Java environment, particularly an SOA environment implemented with Java as an example. A person skilled in the art can understand that the invention is not limited to the Java environment or the SOA environment, but is applicable for the test of server side objects in any client-server environment. In particular, embodiments of the invention refer to methods of Java classes, which are understood to include functions in other environments.

Figure 2:
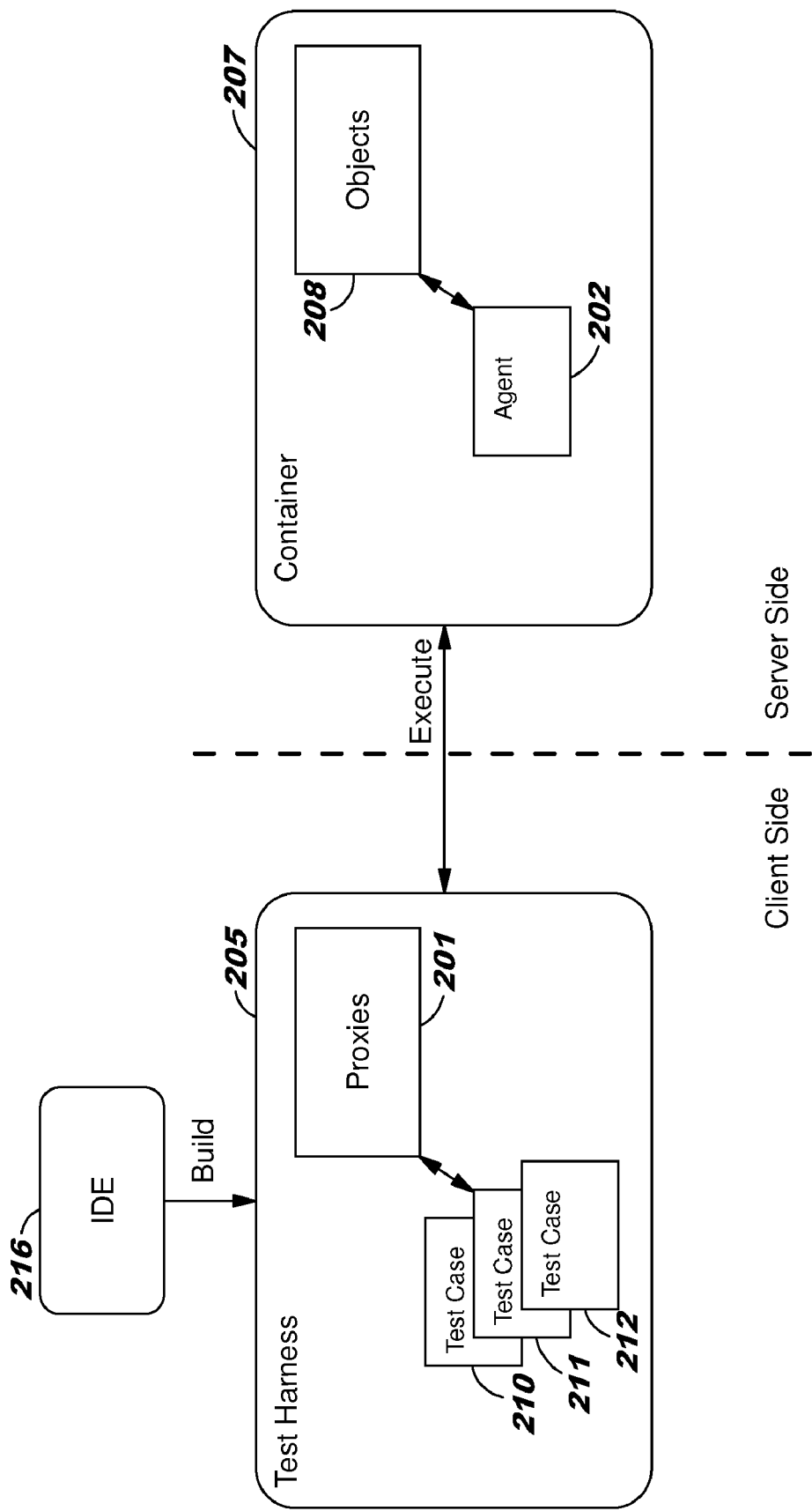
FIG. 2 illustrates a testing system with loose-coupled test logic and server side objects in a client-server environment according to an embodiment of the invention.

FIG. 2 illustrates a system to test server side objects with loose-coupled test logic in a client-server environment according to one embodiment. As shown in the figure, the system comprises proxies 201 on the client side and an agent 202 on the server side.

The proxies 201 are located in a test harness 205 on the client side, and can interact with a test cases, 210, 211, 212, i.e., be invoked by the test case and pass the invocation result to the test case. In one embodiment, the proxies 201, the test case and the test harness where they are located are all in a J2SE environment. The agent 202 is located in a container 207 on the server side and can interact with objects 208 deployed in the container on the server side, i.e., invoke the object 208 and obtain the invocation result. In one embodiment, the container is a J2EE container 207 and the agent 202 is a Java servlet. The system is located in an SOA environment, and the object is a service or a support object of a service, such as a Java object.

In one embodiment, the proxies 201 comprises a proxy 201 created on the client side of the first object on the server side, and proxies 201 of other objects created dynamically and recursively by the proxy of the first object in the execution process of the test case 210.

The process of obtaining the proxy 201 of the first object can be a typical Java remote dynamic proxy using scenario, where the interfaces or class of the first object needs to be obtained on the client side. In Java, there are several approaches to implement dynamic proxies. For instance, JDK provides a mechanism to generate a dynamic proxy based on any Java interface. In addition, based on a Java compiled class, it is also possible to utilize some Java byte code manipulation frameworks to create a proxy. Specifically, the client can send a request for creating a first object to the agent 202 on the server side, the agent 202 on the server side creates the first object such as a ServiceManager object according to the received request, registers the object and its index identifier with an in-memory registry, and returns the index identifier of the object and its interfaces or class to the client side. And the client creates a proxy 201 of the first object through a proxy factory according to the received index identifier of the object and its interfaces or class. If the interfaces or class of the first object has already existed on the client side or has been designated by the user, then it is not necessary to download the class or interfaces from the server. In this case, the first object is first created on the server side and then the index identifier of the object is returned.

On the other hand, when other new objects are generated by invocation of the first object or other generated objects during the test process, the proxies 201 of the other new objects can be created by the proxies 201 of the first object and other generated objects using Java's dynamic proxy function through a proxy factory according to the index identifiers of the generated other new objects and their interfaces or classes. Such dynamically and recursively created proxies are transparent to the test case 210 on the client side, that is, the test case does not explicitly create the proxies of other server side objects than the first object, it only creates or invokes the other server side objects, and the system of this embodiment of the invention automatically creates the needed proxies of the server side objects for the test case 210.

The proxy 201 of a first object can be created explicitly at the beginning of the execution of the test case 210, and the proxies 201 of other objects can be created recursively during the execution of the test case; alternatively, the proxies 201 of other first objects can be created explicitly multiple times during the execution of the test case 210, and the proxies 201 of other objects can be created by the proxies 201 of the first objects respectively.

In one embodiment, the proxy 201 of the first object and the proxies 201 of other objects created by it on the client side as well as the corresponding first object and the other objects on the server side belong to a same session, and the registration of an object and its index identifier comprise registering the object and its index identifier with a session to which it belongs. In one embodiment, the session is established and maintained through the cookie mechanism.

A proxy 201 thus generated has the same interfaces or methods as those of its corresponding object. Thus, for an external user or invoker, the proxy 201 and its corresponding object are completely identical. Therefore, the test case 210 can invoke the methods of the object through the proxy 201. Further, the generated proxy 201 can interact with all other generated proxies and all non-proxy objects present on the client side. That is, the methods of a proxy can accept other proxies or non-proxy objects as parameters, and the methods of a non-proxy object can also accept proxies as parameters.

Specifically, a proxy 201 (including the proxy of the first object and other proxies created recursively by the proxy of the first object) is configured to, when receiving the invocation of a method of a corresponding object on the server side by the test case 210 (in this context, the invocation of a method of an object should be understood as also including an operation on a field of the object), pass the invocation of the method of the corresponding object by the test case 210 to an agent 202 on the server side over a network, and receive from the agent 202 the execution result of the invocation. In one embodiment, the proxy 201 passes the invocation to the agent 202 via an HTTP request. In other embodiments of the invention, the proxy 201 can also use other protocols to pass the invocation to the agent.

In one embodiment, before passing the invocation of the method of the corresponding object to the agent 202 on the server side through a network, the proxy 201 first checks all the parameters in the invocation, and replaces a proxy therein with a corresponding index identifier, so that the agent on the server side, after receiving the invocation, can find the corresponding object according to the index identifier in the invocation parameters.

In addition, when the process of invoking the method of the object on the server side generates a new object, the proxy 201 can automatically creates a proxy 201 of the new object according to the interfaces or class and the index identifier of the new object received from the agent 202, for example, creating the proxy 202 of the new object through Java's dynamic proxy function. The proxy of the new object thus created will have the same interfaces or methods as those of its corresponding object, thereby can be used by a test case 210 to invoke the methods of its corresponding object, thus can be used to generate the proxies of further new objects, and can interact with existing proxies and non-proxy objects.

In addition, when the proxy 201 finds that a class is lacking in the process of invoking the method of a corresponding object on the server side to conduct the test, it can send a request for the class to the agent 202 over the network. For example, when the return value of the method invocation of the corresponding object on the server side by the proxy 201 is a runtime exception while there is no class of the runtime exception on the client side, the proxy 201 can request the agent 202 for the code such as Java byte code of the runtime exception class and load the code of the class using, for example, a Java class loader, when receiving from the agent 202 the code of the class.

In addition, when a proxy 201 on the client side is released, it can send a release notification to the agent 202 over the network. For example, when the garbage collection function in Java destroys a proxy by invoking the finalize method of the proxy when the proxy no longer has a reference, the proxy can send a release notification containing the object index identifier of this proxy to be destroyed to the agent 202 on the server side through, for example, the HTTP protocol, before being destroyed. Similarly, when a test case or test harness, etc. on the client side is to destroy a proxy on its own initiative by invoking the finalize method of the proxy (for example, when a session ends, all proxies and objects participating in the session will be destroyed, and when a test ends, all the generated proxies and objects will be destroyed) the proxy can send a release notification. Thus, after receiving the release notification, the agent 202 on the server side may destroy the corresponding object according to the object index identifier in the release notification, and deregister the object and its index identifier, for example, by deleting a corresponding entry in an in-memory registry.

Thus, the proxies of all the services and objects that are exposed on the server side can be created dynamically and recursively, so that these proxies can be used as a mock server. Further, the lifecycles of the proxies and those of their corresponding objects are consistent.

The agent 202 deployed on the server side is configured to, when receiving over a network the invocation of a method of a corresponding object on the server side from a proxy 201 on the client side, invoke the method of the object, and pass the execution result of invoking the method of the object such as a normal return value or exception information to the proxy 201 on the client side over the network.

In addition, the agent 202 is further configured to, when receiving a request for loading a class such as an exception class from a proxy 201 on the client side, obtain the resource address of the code of the class from the request, obtain the code of the class from the resource address, and pass the code of the class to the proxy 201 on the client side over the network.

In addition, as mentioned above, when the agent 202 receives over the network an invocation of a constructor method of the first object from a test case on the client side, it invokes the constructor method of the first object according to the received invocation so as to create the first object; registers the first object and the index identifier of the first object; and passes the index identifier of the first object and the interfaces or class of the first object to the client side over the network, so that the client can create the proxy of the first object according to the received index identifier and the interfaces or class of the first object. Here, the constructor method of the first object should be understood as also including static fields and other static methods in the class of the first object for creating the first object.

In one embodiment, the agent 202 is configured to, before invoking the method of a corresponding object according to the received invocation, check all the parameters of the invocation and replace the index identifiers therein with corresponding server side objects. In addition, the agent 202 is configured to, when the process of invoking the method of the object generates a new object, register the new object and the index identifier of the new object, obtain the interfaces or class of the new object, and pass the index identifier of the new object and the interfaces or class of the new object to the proxy 201 on the client side over the network. In one embodiment, the agent 202 registers the new object and its index identifier with the session to which the object belongs.

The agent 201 can use the native feature of Java such as java.lang.Class and API in the java reflection package to analyze and obtain the interfaces and operations of any Java objects including the first object and the new object.

In addition, the agent 202 is further configured to, when receiving a release notification from a proxy 201 on the client side, release a corresponding object according to the index identifier in the notification and deregister the object and its index identifier. In one embodiment, the agent 202 releases a corresponding object according to the index identifier in the notification and deregisters the object and its index identifier in the session to which the object belongs.

While in the foregoing testing system of server side objects with loose-coupled test logic in a client-server environment according to one embodiment has been described, it should be noted that the described system is only an illustration instead of a limitation to the invention. The system of the invention may have more, fewer or different modules, and the connection relationships and the inclusion relationships among the modules may be different. For example, the function of interaction with the agent 202 in the proxy 201 may also be performed by a separate module.

Figure 3:
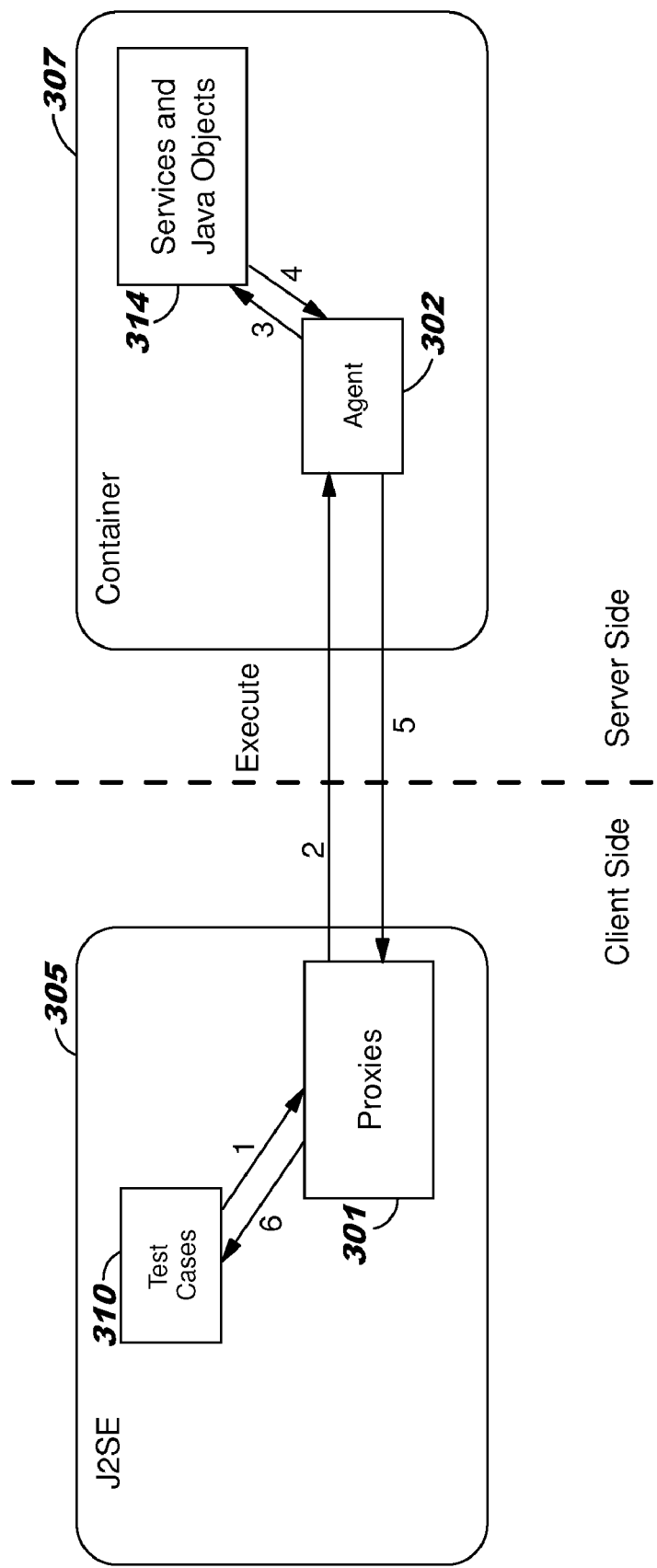
FIG. 3 is a schematic diagram illustrating the process and mechanism of moving in-container test logic from the server side to the client side using dynamic recursive proxies in test cases by the system according to an embodiment of the invention.

FIG. 3 schematically illustrates an exemplary process and mechanism of using dynamic recursive proxies 301 in a test case to move the in-container test logic from the server side down to the client side by the above-mentioned system according to the embodiment of the invention.

As shown, both the test case 310 and proxies 301 run in a J2SE environment, while the target objects 314 to be tested run in a server container 307. The test case 310 encapsulates test logic, which uses object proxies 301 to invoke object 314 methods. The object proxies 301 pass the invocation of object 314 methods to an agent 302 on the server side, and the agent will create and manage the corresponding services or Java object instances. In this way, the test logic is the client side rather than the server side.

Specifically, as shown in the figure, in step 1, the test case uses a first dynamic proxy 301 to invoke some operation of a remote object. The client can use objects or proxies as input and output parameters.

In step 2, the dynamic proxy 301 passes a request to an agent on the server side via an HTTP request. In step 3, the agent 302 on the server side invokes the operation on the server side. In step 4, if a return object is created on the server side, then the agent 302 will look up all of the relevant interfaces and register the object and its index identifier in a registry. In step 5, the agent 302 returns available interfaces and the object index identifier to the proxy 201 on the client side. In step 6, the proxy 301 creates another corresponding proxy and returns it to the test case.

The process then may return to step 1, invoke other operations of the first object or invoke some operation of the corresponding object through the newly generated proxy 301, thus executing the above steps iteratively.

Figure 4:
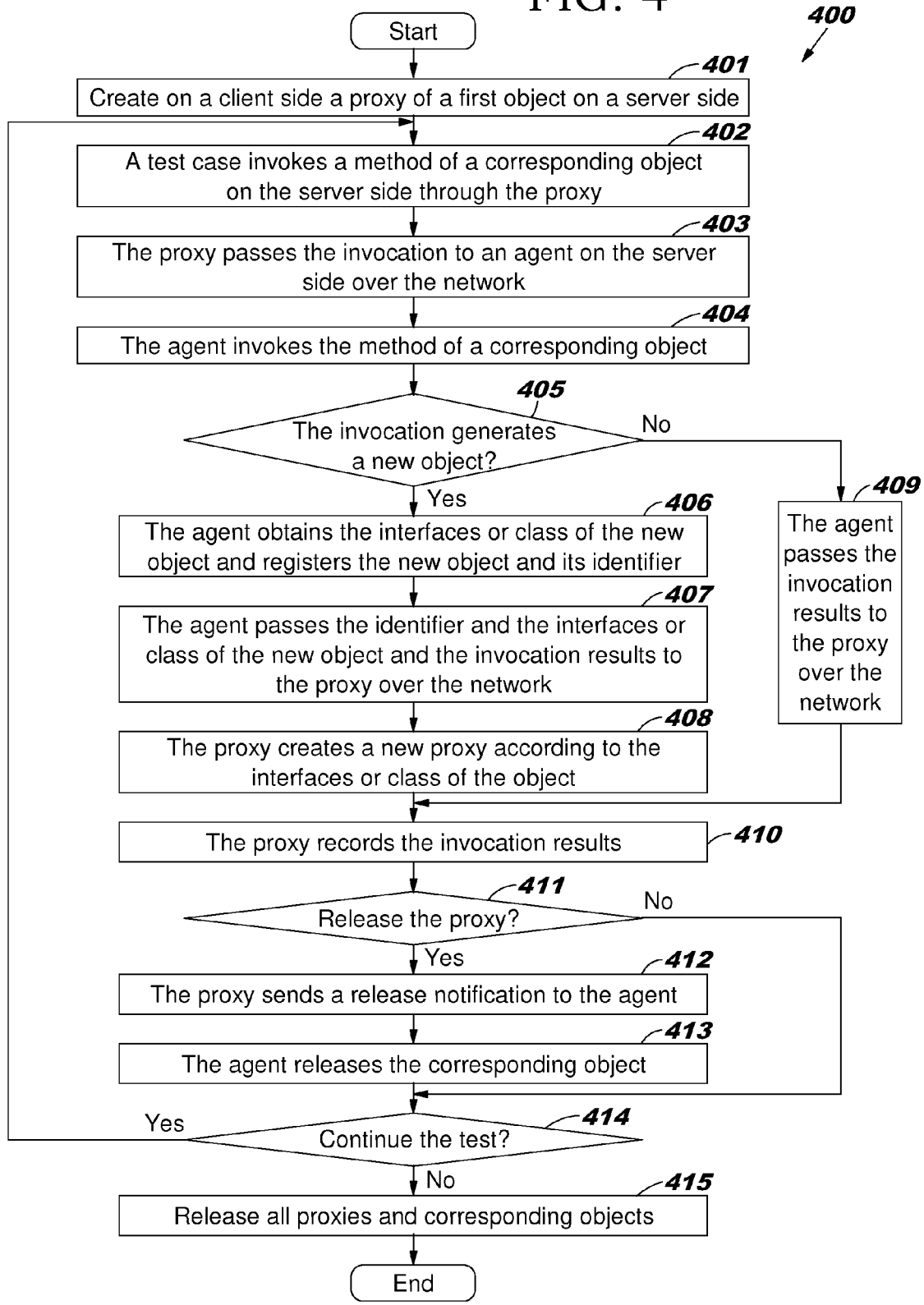
FIG. 4 illustrates a testing method with loose-coupled test logic and server side objects in a client-server environment according to an embodiment of the invention.

A method and system of testing server side objects with loose-coupled test logic in a client-server environment according to one embodiment will be described specifically below with reference to FIG. 4. The method may be carried out by the above mentioned embodiments of the invention. Thus, for the conciseness of description, some content similar to that of the above description will be omitted in the following description for the method of the invention.

As shown in the figure, in step 401, a proxy of a first object on the server side is created on the client side. The process of obtaining the proxy of the first object can be a typical Java remote dynamic proxy using scenario, where it is needed to obtain the interfaces or class of the first object an the client side. Specifically, the client can send a request for creating a first object to a agent on the server side, the agent on the server side creates the first object such as a ServiceManager object according to the received request, registers the object and its index identifier in a registry, and returns the index identifier of the object and its interfaces or class to the client side. And the client creates a proxy of the first object through a proxy factory according to the received index identifier of the object and its interfaces or class. If the interfaces or class of the first object have already existed an the client side or have been designated by a user, then it is not needed to download the class or interfaces from the server again, and it is only needed to first create the first object on the server side and then return the index identifier of the object.

In the execution process of a test case, only the proxy of a first object can be created while the proxies of all other objects can be created recursively by the proxy of the first object; alternatively, the proxies of a plurality of identical or different first objects can be created and the proxy of each first object can recursively create the respective proxies of other objects.

The process of creating the proxy of a first object an the client side can be initiated by a test case deployed an the client side at the beginning of a test process or during the test process, initiated by a test harness on the client side, or initiated by another component on the client side.

In step 402, the test case deployed on the client side invokes the methods of corresponding objects on the server side by using the created proxies to conduct the test. That is, immediately after creating the proxy of the first object, the method of the first object can be invoked by using the proxy of the first object; and after creating recursively the proxies of other objects, the methods of other corresponding objects can be invoked by using the proxies of other objects. When invoking the methods, the client side can use objects or proxies present on the client side as input and output parameters.

In step 403, the proxy passes the invocation of the method of the first object by the test case to the agent on the server side. For example, the proxy can pass the invocation to the agent on the server via an HTTP request. Of course, the proxy can also pass the invocation to the agent of on server by using any other protocols or technologies.

In one embodiment, before passing the invocation of the method of the first object to the agent on the server side over the network, the proxy first examines all the parameters in the invocation, and replaces the proxies therein with corresponding index identifiers. In step 404, after receiving an invocation from the client side, the agent invokes the method of the first object to conduct the test.

In one embodiment, before invoking the method of the corresponding object according to the received invocation, the agent checks all the parameters of the invocation and replaces the index identifiers therein with corresponding server side objects. In step 405, the agent determines whether the invocation generates a second object.

If the determination is that the invocation generates a second object, then in step 406, the agent on the server side looks up all related interfaces or class of the second object, and registers the second object and the index identifier of the second object, for example, with a session to which the second object belongs.

In step 407, the agent passes the execution results of invoking the method of the first object, such as a normal result or information on an exception, as well as the index identifier of the generated second object and its interfaces or class to the proxy of the first object on the client side over the network by using the HTTP protocol, for example.

In step 408, the proxy of the first object automatically creates the proxy of the second object according to the interfaces or class of the second object and its index identifier received from the agent on the server side.

The proxy of the second object thus generated has the same interfaces or class as those of the second object. Thus, for external users or invokers, the proxy is completely identical to the second object. In addition, the proxy of the second object can interact with other proxies and objects present on the client side.

In addition, the proxy of the second object is further capable of sending the received invocation of a method of the second object to the agent on the server side, and of receiving the execution results of the invocation of the method, including the return value and exception of the invocation of the method, etc., from the agent on the server side. If the invocation of the method returns a new object, then the proxy can generate the proxy of the new object according to the returned index identifier and interfaces or class of the new object. That is, the proxy of the second object can dynamically and recursively create the proxies of other objects.

On the other hand, if the determination in step 405 is that the invocation does not generate a new object, then step 409 is performed, in which the agent passes the results of the invocation to the proxy. In step 410, the proxy records the execution results so as to be analyzed and debugged by a user.

In the execution process of the test case, in step 411, it can be determined whether a proxy will be released. For example, when an object does not have a reference, the garbage collection function of Java can invoke the finalize method of the object to destroy the object. Thus the proxy realized according to one embodiment can judge whether its finalize method is invoked so as to determine whether it will be released. Of course, in other embodiments of the invention, the test case or test harness, etc. on the client side can also release the proxy on its own initiative by invoking the finalize method of the proxy, for example releasing all the proxies participating in a session at the end of the session.

If the determination of step 411 is yes, then step 412 is performed, in which, when a proxy on the client side is to be released, the proxy sends a notification to the agent on the server side over the network before being released.

In step 413, the agent releases a corresponding object according to the received release notification, and deregisters the object.

When the agent has released all the objects in a session according to release notifications from the client side, it can further release the session.

In step 414, the test case or test harness, etc. on the client side determines whether to continue the test.

If the determination is yes, then step 402 is returned to continue to invoke a corresponding object on the server side using the original proxy or a new created proxy, so as to conduct the test, thus executing the above process iteratively, and creating the proxies of other objects dynamically and recursively during the test process if necessary.

If the determination is no, then step 415 is performed, in which all proxies are released on the client side, respectively, and the agent is notified to release all the corresponding objects on the server side, thus the test process ends.

While in the foregoing a testing method with loose-coupled test logic and server side objects in a client-server environment according to one embodiment has been described, it should be noted that the described method is only an illustration instead of a limitation to embodiments of the invention. The methods of embodiments of the invention can have more, less or different steps, and the order of the steps can be different or the steps can be executed in parallel. For example, the step 411 for determining whether to release the proxy and the step 414 for determining whether to continue the test can be performed at any other time than that shown in the figure.

Figure 5:
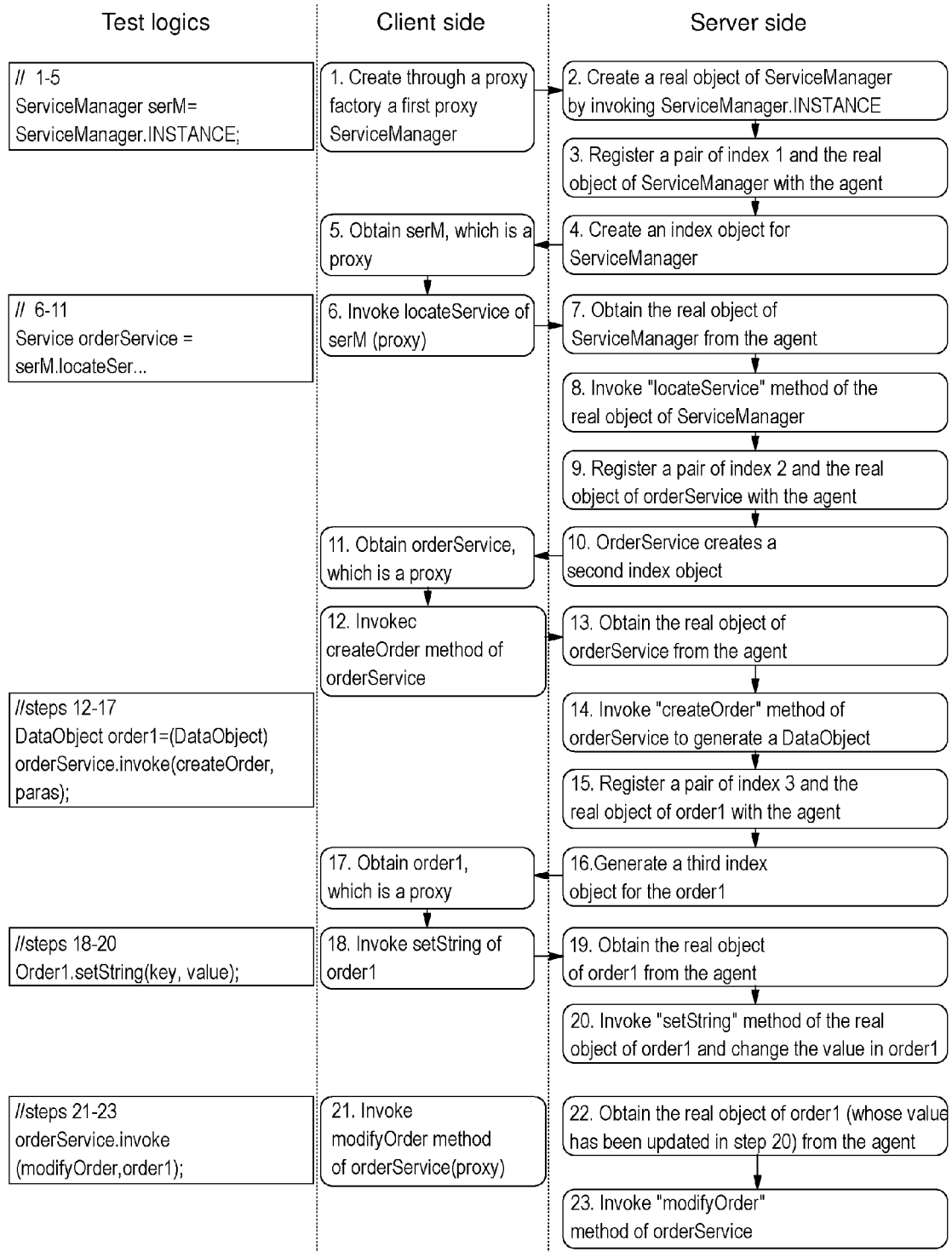
FIG. 5 illustrates the specific steps performed by the system according to an embodiment of the invention on both the client side and the server side with respect to an embodiment of the invention.

In the following a segment of an exemplary test logic is presented. FIG. 5 illustrates specific steps performed by the system of embodiments of the invention with respect to the exemplary test logic on both the client side and the server side.

```
ServiceManager serM = ServiceManager.INSTANCE;
    // Create ServiceManager
Service orderService = serM.locateService("orderServicePartner");
    // Find orderService through ServiceManager. orderService
    is a service on the server side.
DataObject order1 = (DataObject) orderService.invoke
("createOrder", paras);    // Invoke createOrder method of orderService,
    create an order and store it in a database. Return the created order
    object named order1.
order1.setString(key, value); // Modify a value in order1.
orderService.invoke("modifyOrder",order1); // Invoke modifyOrder
    method of orderService, and update the modified order1 object in
    the database
```

In the following, exemplary pseudo code is presented of various components of embodiments of the invention that may be implemented in Java. It should be noted that the following pseudo code are only an illustration, which is intended to make a person skilled in the art to better understand the basic concept of embodiments of the invention and be able to implement embodiments of the invention, rather than a limitation to embodiments of the invention. For example, the client side communication module in the exemplary pseudo code can also be regarded as being contained in the proxy.

Exemplary Pseudo Code
Implementation of proxies
 a) Creating a proxy by an interface list
  Object newProxyInstance(Class[ ] interfaces, String keyId){
   1. Create InvocationHandler from keyId. The invocation of all proxies are to be
    processed by invoke method of InvocationHander
    InvocationHander handler=new InvocationHandler( ){
     public Object invoke(Object targetobj, Method method, Object[ ] args) {
      1.1 Invoke a client side communication module
      String name=method.getName( );
      Class[ ] types=method.getParameterTypes( );
      Object rtobj=chat(keyId,name,types, args);// See the pseudo code of chat method
     1.2 Processing results
     1.2.1 The case of a null pointer
     if (rtobj==null)
     return null;
     1.2.2 The case that a return value needs to create a proxy or process an exception
     if (rtobj instanceof ChinRtObj) {
      ChinRtObj chinRtObj=(ChinRtObj)rtobj;
      Throwable t=chinRtObj.getThrowable( );
      if(t!=null)throw t;// Process the exception
      Class[ ] interfs=chinRtObj.getInterfaces( ); String keyId=chinRtObj.getKeyId( );
      return ChinProxy.newProxyInstance(interfs, keyId);// Reinvoke to generate a new proxy.
     1.2.3 Primitive type and String
     } else if (ChinUtil.isPrimitive(rttype)||String.class.equals(rttype)) {
      // return type is primitive class or type or String
      return rtobj;
     1.2.4 Array
     } else if (rtobj.getClass( ).isArray( )) {Generate a proxy for each value in the array (if necessary)
     }
    2. Create and return a proxy
     Proxy.newProxyInstance(clasLoader, interfaces, handler);}
 b) Creation of a first proxy
  i. Creation of the first proxy based on an interface
   1. Description of the method
    Object newProxyInstance(Class[ ] interfaces, String implClassName, String name, Class[ ] types, Object[ ] args)
    interfaces—interface list
    implClassName—Implementation class name
    name—if name is a null pointer, create based on a constructor method;
    if name is not a null pointer and types is a null pointer, create based on a static field; and name refers to the name of the static field;
    if name is not a null pointer and types is not a null pointer, create based on a static method; and name refers to the name of the static method;
    types—it refers to a method parameter type list when creating based on a static method
    args—it refers to a method parameter value list when creating based on a static method
    This is a generic method, and in practical use there will be some encapsulation, but all final invocations come down to this method.
   2. Implementation of the Method
    {
     a) Invoke the client side communication module to obtain a return value
     Object obj=chat(implClassName, name, types, args);
     b) Process the result: what is returned is a proxy
     if (obj instanceof ChinRtObj) {
      String keyId=((ChinRtObj) obj).getKeyId( );
      return ChinProxy.newProxyInstance(interfaces, keyId);}
     c) Process the result: what is returned is not a proxy
     return obj;}
  ii. Creation of a first proxy based on the class
   1. Description of the method
    Object newProxyInstance(Class implClass, Class[ ] types, Object[ ] args)
    wherein, implClass is an implementation class
    types—a parameter type list of a constructor method of the implementation class
    args—a parameter value of the constructor method of the implementation class
   2. Implementation of the method
    The present implementation uses a byte code generation tool of ASM, and ASM is equivalent to Java's assembly code.
    See ASM's homepage http://asm.objectweb.org for how to dynamically create a class
    Here, assume implClass is class A. A general idea is that the implementation class creates two classes, one is an interface C with all its methods, and another is its subclass B. There is created in its subclass B a field proxyInstance, which uses the interface C as an interface list and is created in the manner of the creation of the interface-based first proxy; the subclass B overloads all the methods of the parent class A, and redirects all method invocations to the invocation of proxyInstance; then a corresponding instance of the subclass B is returned as a proxy. Since the subclass B is a subclass of the parent class A, a reflection may be done as follows:

A a=(A) newProxyInstance(A.class, new Class[ ]{ }, new Object[ ]{ });

a) Create the subclass B
  i. Dynamically resolve all methods of class A, generate a Java interface C which contains all the methods of A
  ii. Generate a proxy based on a constructor method (name=null):
  String implClassName=implClass.getName( );
  Class[ ] interfaces=new Class[ ] {C.class};
  proxyInstance=newproxyInstance(interfaces, implClassName, null, types, args);
  iii. ImplClass A dynamically generates its subclass B, with proxyInstance as a field of the subclass B. The subclass B implements all the methods of the parent class A. An example is as follows:
  class B extends A {
  C_proxyInstance
  . . .
  // The following is an implementation of a certain method
  return type methodA (parameter list) {
  return_proxyInstance.methodA (parameter list)
  □
  }
  . . .
  } b) Return an instance of the subclass as a proxy
  i. Find a corresponding constructor method of the subclass
  Constructor constructor=subClass.getConstructor(types)
  ii. Return a subclass instance
  return constructor.newInstance(args);

Implementation of the client side communication module a. Interface of the client side communication module
  public Object chat(String target, String name, Class[ ] types, Object[ ] args), wherein, target is an index identifier of a real object or a full name of an implementation class name is a method or static field on an invoked target, and if it is a null pointer, then it refers to a constructor method; if the name is not a null pointer and types is a null pointer, then the name refers to a static field; if neither name nor types is a null pointer, then it refers to a non-constructor regular method. Non-constructor regular methods have two kinds: one kind is static methods (methods of classes), the other kind is non-static methods (methods of objects); when target is an implementation class, and neither name nor types is a null pointer, name refers to a static method; and when target is an index identifier of a real object, and neither name nor types is a null pointer, name can be either a non-static method or a static method.

types is a parameter type list when name refers to a method (including a regular method and a constructor method)
  args is a parameter value list when name refers to a method (including a general method and a constructor method)

b. How to use the interfaces of the client side communication module
  At present there are two usages:
  iii. Invoke a method named name on target whose parameter type is types with a parameter value being args, to obtain a return value, and here there is two kinds of method named name:
    1. Methods of a class, which also have two kinds:
      a) Constructor method, equivalent to new A( )
      b) Static method, equivalent to A.methodA( ), wherein methodA is a method of class A
    2. Methods of an object, equivalent to A a=new A( ); a.methodB( ), wherein methodB is a method of object a, which can not be invoked by using A.methodB( );
  target also has two kinds:
    1. Full name of an implementation class
      If name is the full name of an implementation class, then the client side communication module is used for the creation of the first proxy
    2. Index identifier of a real object
      What is invoked here is generally a method of a proxy. Some invocations of the system also go in this branch (such as garbage collection).
  iv. Obtain a static field named name on target, and the return value is the static field this branch is also used for the creation of the first proxy.

c. Specific implementation pseudo code of the client side of the agent:
  public Object chat(String target, String name, Class[ ] types, Object[ ] args){
    1. Create a connection to the agent
      URL url=new URL("http://localhost:9080/vRecoveryTestWeb/ . . . ");
      // The agent is a servlet
      HttpURLConnection connection=(HttpURLConnection) url.openConnection( );
    2. Set a sent cookie (use cookie and session mechanism to maintain a session in conjunction with step 6) sendCookies(connection);// Set cookie
    3. Set the request method to be POST, with the sent data type being Java serialized data.
      connection.setDoOutput(true); connection.setRequestProperty
      ("Content-Type", "application/x-java-serialized-object");
      connection.setRequestMethod("POST");
    4. Gather data, and prepare to write data to the agent
      Object[ ] params=new Object[ ] {target, name, types, args};
    5. Write data to the agent
      OutputStream outputStream=connection.getOutputStream( );
      writeObject(outputStream, params);// That a proxy accepts a proxy is implemented here. See the pseudo code of writeObject for details.
    6. Accept the cookie of this time in preparation for the requesting to send next time.
      setCookies(connection);

7. Accept data
    InputStream
        inputStream=connection.getInputStream( );
        Object obj=readObject(inputStream);// To load from the server side a class not present on the client side is implemented here. See the pseudo code of readObject for details
        connection.disconnect( ); // disconnect
8. Return a result
    return obj;}
writeObject(OutputStream outputStream, Serializable params){
    1. Create an object output stream
        ObjectOutputStream oos=new ObjectOutputStream (output Stream){
        // Overload replaceObject method, and if the object is a proxy then replace it
        with KeyId
            protected Object replaceObject(Object obj) throws IOException {
            If obj is a proxy, then obtain from obj its KeyId and return it;
            Otherwise return obj;
            }
        };
    2. Write an object
        Since an overloaded object output stream is used, object params, including the references to all other objects therein, will invoke replaceObject to check whether it needs to be replaced with a corresponding KeyId.
        oos.writeObject(params);
        oos.flush( );
        oos.close( );}
Object readObject(InputStream inputStream){
    1. Create an object input stream
        ObjectInputStream ois=new ObjectInputStream(inputStream){
        // Overload resolveClass to check whether all classes is complete.
            protected Class resolveClass(ObjectStreamClass desc) {
            try {
                return super.resolveClass(desc);}
            catch (ClassNotFoundException e) {
                // If some class does not exist, load the class from a remote class loader
                String className=desc.getName( );
                return classLoader.loadClass(className);}}□
    2. Read a returned value
        During the execution of this step, each class the returned value depends on will be checked through resolveClass, and if it is found not present, then it is loaded remotely. Here the return value can be a normal return or an exception return. For an exception return, the case where a class definition needs to be loaded remotely often occurs.
        Object obj=cois.readObject( );
        cois.close( );
        return obj;}
Implementation of the agent
a. The agent is implemented as a servlet, and the agent has two tasks
    v. The client side obtain the byte code of a class definition from the agent by using a GET request.
    vi. The client side invokes a corresponding method of a real object through the agent by using a POST request.
b. Implementation pseudo code of the agent GET
    void doGet(HttpServletRequest req, HttpServletResponse resp) {
    1. Obtain the resource name of a class from a requested URL
        The resource name of a class and the class name have a simple mapping:
        className.replace('.', '/').concat(".class"); String url=req.getRequestURL( ).toString( );
        String resourcename=getResourceName(url);
    2. Obtain byte code from the resource name and write it into an output stream
        OutputStream out=resp.getOutputStream( );
        loadResourceBytes(resourcename, out);}
c. Implementation pseudo code of the agent POST
    void doPost(HttpServletRequest req, HttpServletResponse resp) {
    try {
    1. Obtain a corresponding session from a corresponding cookie, which is to be understood be reference to step 2 and step 6 of 1.c.chat
        HttpSession session=req.getSession(true)
    2. Read parameters from an input stream. Since the parameters may have KeyIds of proxies therein, corresponding replacements will be made in readParams to replace KeyIds of the proxies with real objects. See the pseudo code implementation of readParams method for details.
        InputStream inputStream=req.getInputStream( );
        Object[ ] params=readParams(inputStream,session);
    3. Invoke a corresponding method and obtain results.
        Object result=invoke(session, // session
        (String) params[0], // target
        (String) params[1], // method name or field name
        (Class[ ])params[2], // types
        (Object[ ]) params[3]); // args
    4. Write the result. See the pseudo code of writeResult for details
        writeResult(resp .getOutputStreamo, result);
    5. Process exceptions in the invocation process and write back the exceptions to the client side.
        catch (InvocationTargetException e) {
        Throwable te=obtain the fundamental reason of the exception
        ChinRtObj rtobj=new ChinRtObj(null);
        rtobj.setThrowable(te);
        writeResult(resp. getOutputStream( ), rtobj);}
    readParams(InputStream inputStream,final HttpSession session) {
    1. Create an object input stream, overload resolveObject method, replace KeyId with a corresponding real object. The implementation of resolveObject is as follows:
        protected Object resolveObject(Object obj) {
        if(obj instanceof Chin) {
            return session.getAttribute(((Chin)obj).getKeyId( ));
        }
        return obj;
        }
    2. Read an object from the object input stream and return.
    }

```
void writeResult(OutputStream outputStream,
    Object result) {
1. Create an object output stream
    ObjectOutputStream objectOutputStream=new
        ObjectOutputStream(outputStream);
2. Write the result
    objectOutputStream.writeObject(result);
    objectOutputStream.flush( );
    objectOutputStream.close( );
Object invoke(HttpSession session, String target,
    String name, Class[ ] types, Object[ ] args){
    1. Look up a target object,
        The target object has three possible values: a
            session itself, a value registered with the session
            and a null pointer. The session itself and an
            object registered with the session are processed
            uniformly, and when the target is a null pointer, it
            is processed as when creating a new target
            object.
        if (SESSION.equals(target)) {// Determine
            whether the target object is the session itself
            targetObj=session;}
        else {// If not look up the target in the session
            targetObj=session.getAttribute(target);}
    2. If it is not found, create a new target object, and
        register the target object in a session registry and
        return the KeyId of the target object.
        if (targetobj==null){
            Object obj=chinchilla(target, name, types, args);
            // logic in chichilla:
            // 1. if (name !=null && types==null), create by
                a static field
            // 2. else if (name!=null && types!=null), create
                by a static method
            // 3. else create by a constructor method
            ChinRtObj initkey=genRtObject( );// Generate a
                unique KeyId
            // Register
            session.setAttribute(initkey.getKeyId( ), obj);
            // Return
            return initkey;
        }
    3. Otherwise, invoke a method on the target object
        Method method=ChinUtil.getMethod(targetob-
            j.getClass( ), name, types);
        Object result=method.invoke(targetobj, args);
    4. Process the results: primitive type and array
        Class rtType=method.getReturnType( );
        // deal with primitive type
        if (result==null||ChinUtil.isPrimitive(rtType)||
            rtType.equals(String.class)) {
            return result;}
        // Process an array
        if (result.getClass( ).isArray( )) {
            return arrayResult(session, result);
        }
    5. Process the results: object
        // Look up all interfaces in the return object class
        Class[ ] rtypes=findInterfaces(result);
        // Generate a return object having a unique KeyId
        ChinRtObj rtobj=genRtObject( );
        // Register the return object session.setAttribute
            (rtobj.getKeyId( ),
            result);
        // Set the interface list
        rtobj.setInterfaces(rtypes);
        Return the results
        return rtobj;
    }
Implementation of garbage collection
Overload a method of InvocationHandler
    protected void finalize( ) {
        Invoke a method of the client side communication mod-
            ule, remove a corresponding object from the session
            object, and the number of references to the real object
            will be decremented by
        1. If the number of references to the real object is 0, a
            garbage collection process on the server side is
            entered.
            chat(SESSION, "removeAttribute",
                new Class[ ] {String.class},
                new Object[ ] {keyId})
    }
        It should be noted that, finalize is initiated by the
            garbage collector on the client side, instead of
            being invoked by a user on his own initiative.
            'keyId' can be obtained from InvocationHandler,
            since the keyed is provided when we create our own
            InvocationHandler. See the section of the creation
            of InvocationHandler.
```

Embodiments of the invention can be realized in hardware, software, firmware or a combination thereof. A typical combination of hardware and software may be a general purpose computer system having a computer program, which, when being loaded and executed, controls the computer system to enable it to carry out the method described herein. Embodiments of the invention is preferably realized in a distributed manner. In the distributed manner, different elements are distributed in a number of interconnected computer systems. Embodiments of the invention is more preferably realized in a client-server environment, in which, a client may send a request for obtaining information or performing an operation to a server by using a certain protocol, and the server may respond by providing the information or performing the operation. Any computer systems or other devices adaptable to carry out the methods described herein are applicable.

Embodiments of the invention can also be embodied in a computer program product, which comprises all the features enabling the realization of the methods described herein, and when being loaded into the computer system, can carry out these methods. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the invention is shown and described particularly with reference to the preferred embodiments, a person skilled in the art can understand that various changes in form and detail can be made thereto without departing from the spirit and scope of the invention.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand embodiments of the invention for various embodiments with various modifications as are suited to the particular use contemplated.

The invention claimed is:

1. A method of testing server side objects in a client-server environment, comprising the steps of:
    creating a proxy of a first object on a server side on a client side;
    invoking, by the proxy, a method of the first object to test a test case deployed on the client side;
    generating a second object from the method of the first object; and
    creating a proxy of the second object on the client side by the proxy of the first object; and
    recursively re-performing the steps of invoking, generating, and creating to test a subsequently generated object.

2. The method according to claim 1, further comprising:
    invoking the method of the first object on the server side through the proxy by the test case;
    passing the invocation of the method of the first object by the test case to an agent on the server side over a network by the proxy;
    invoking the method of the first object according to the invocation by the agent; and
    passing the execution results of invoking the method of the first object to the proxy on the client side over the network by the agent.

3. The method according to claim 2, further comprising:
    replacing a proxy in the parameters of the invocation with a corresponding index identifier; and
    replacing the index identifier in the invocation with a corresponding server side object.

4. The method according to claim 2, the step of creating a proxy of the second object further comprising:
    registering the second object and the index identifier of the second object by the agent;
    passing the index identifier of the second object and a class of the object to the proxy of the first object on the client side over the network; and
    creating a proxy of the second object according to the received index identifier of the second object and the received class of the second object by the proxy of the first object.

5. The method according to the method of claim 2, the step of creating a proxy of the first object further comprising:
    passing the invocation of a constructor method of the first object to the agent on the server side over the network by the test case;
    invoking the constructor method of the first object according to the received invocation by the agent to create the first object;
    registering the first object and the index identifier of the first object by the agent;
    passing the index identifier of the first object and a class of the first object to the test case on the client side over the network by the agent; and
    creating a proxy of the first object according to the received index identifier and the class of the first object by the test case.

6. The method according to claim 1, further comprising the steps of:
    releasing a proxy on the client side;
    sending a release notification to the agent on the server side over the network by the proxy; and
    releasing a corresponding object according to the notification by the agent.

7. The method according to any of claim 6, the step of sending a release notification further comprising:
    sending a release notification between the proxy and the agent is conducted through the HTTP protocol.

8. The method according to claim 1, the steps of the step of creating a first object further comprising:
    creating the first object in a J2EE container on the server side.

9. The method according to claim 8, the step of creating a proxy further comprising:
    creating the proxy by a dynamic proxy function of a Java environment.

10. A computer program product to test server side objects in a client-server environment, the computer program product comprising a non-transitory computer readable storage medium having computer readable program code therein, the computer readable medium comprising:
    computer readable program code configured to create a proxy of a first object on a server side on a client side;
    computer readable program code configured to invoke, by the proxy, a method of the first object to test a test case deployed on the client side;
    computer readable program code configured to generate a second object from the method of the first object; and
    computer readable program code configured to create a proxy of the second object on the client side by the proxy of the first object; and
    computer readable program code configured to recursively re-perform creation of a another proxy, invoke another object, and create a proxy of the another object to test the another object.

11. The computer program product of claim 10, further comprising:
    computer readable program code configured to invoke the method of the first object on the server side through the proxy by the test case; and
    computer readable program code configured to pass the invocation of the method of the first object by the test case to an agent on the server side over a network by the proxy.

12. The computer program product of claim 11, further comprising:
- computer readable program code configured to replace a proxy in the parameters of the invocation with a corresponding index identifier; and
- computer readable program code configured to replace the index identifier in the invocation with a corresponding server side object.

13. The computer program product of claim 11, the step of creating a proxy of the second object further comprising:
- computer readable program code configured to register the second object and the index identifier of the second object by the agent;
- computer readable program code configured to pass the index identifier of the second object and the class of the object to the proxy of the first object on the client side over the network; and
- computer readable program code configured to create a proxy of the second object according to the received index identifier of the second object and the received class of the second object by the proxy of the first object.

14. The computer program product of claim 11, the step of creating a proxy of the first object further comprising:
- computer readable program code configured to pass the invocation of a constructor method of the first object to the agent on the server side over the network by the test case; and
- computer readable program code configured to create a proxy of the first object according to a received index identifier and class of the first object by the test case.

15. The computer program product of claim 10, further comprising the steps of:
- computer readable program code configured to release a proxy on the client side; and
- computer readable program code configured to send a release notification to the agent on the server side over the network by the proxy.

16. The computer program product of claim 15, the step of sending a release notification further comprising:
- computer readable program code configured to send a release notification between the proxy and the agent through the HTTP protocol.

17. The computer program product of claim 10, further comprising:
- computer readable program code configured to create the first object in a J2EE container on the server side.

18. The computer program product of claim 17, the step of creating a proxy further comprising:
- computer readable program code configured to create the proxy by a dynamic proxy function of a Java environment.

* * * * *